United States Patent
Mayer et al.

(10) Patent No.: US 8,095,821 B2
(45) Date of Patent: Jan. 10, 2012

(54) DEBUGGING FOR MULTIPLE ERRORS IN A MICROPROCESSOR ENVIRONMENT

(75) Inventors: Ulrich Mayer, Boeblingen (DE); Timothy John Slegel, Staatsburg, NY (US); Chung-Lung Kevin Shum, Wappingers Falls, NY (US); Frank Lehnert, Weil (DE); Guenter Gerwig, Simmozheim (DE)

(73) Assignee: International Business Machines Corporation, Armonk, NY (US)

( * ) Notice: Subject to any disclaimer, the term of this patent is extended or adjusted under 35 U.S.C. 154(b) by 155 days.

(21) Appl. No.: 12/405,418

(22) Filed: Mar. 17, 2009

(65) Prior Publication Data
US 2010/0241899 A1  Sep. 23, 2010

(51) Int. Cl.
*G06F 11/00* (2006.01)
(52) U.S. Cl. .............. 714/10; 714/25; 714/30; 714/45
(58) Field of Classification Search .............. 714/10, 714/25, 30, 33, 45, 48
See application file for complete search history.

(56) References Cited

U.S. PATENT DOCUMENTS

| | | | |
|---|---|---|---|
| 5,444,859 A * | 8/1995 | Baker et al. ............... | 714/30 |
| 6,311,261 B1 * | 10/2001 | Chamdani et al. .......... | 712/23 |
| 6,536,000 B1 * | 3/2003 | Jackson et al. ............ | 714/48 |
| 6,647,517 B1 * | 11/2003 | Dickey et al. ............. | 714/48 |
| 6,708,295 B2 * | 3/2004 | Fujiwara .................. | 714/45 |
| 7,370,243 B1 * | 5/2008 | Grohoski et al. .......... | 714/48 |
| 7,451,357 B2 * | 11/2008 | Dickenson et al. ......... | 714/45 |
| 2007/0079176 A1 * | 4/2007 | Armstrong et al. ......... | 714/22 |

* cited by examiner

*Primary Examiner* — Robert Beausoliel, Jr.
*Assistant Examiner* — Joseph D Manoskey
(74) *Attorney, Agent, or Firm* — Zilka-Kotab, PC

(57) ABSTRACT

A new method and apparatus have been taught for storing error information used for debugging as generated by the initial and subsequent error occurrences. In this invention, a register with several bit ranges is used to store error information. The first bit-range is allocated to the initial error information. If the total number of the errors exceeds the capacity of the register, the last error is kept in a last bit-range. This way, precious initial error information (as well as the last error information) will be available for debugging.

20 Claims, 2 Drawing Sheets

DEBUGGING FOR MULTIPLE ERRORS IN A MICROPROCESSOR ENVIRONMENT

BACKGROUND OF THE INVENTION

It is crucial to discover the origin of hardware errors. However, it is often not a trivial task because of the quick propagation of errors to different units of the hardware. A large volume of signals must be stored for building an error history to help understand the chip's behavior under debugging. In an error prone system, it is likely that multiple error scenarios occur when or after a first error is recovered. It is difficult to access debugging data in multiple error scenarios. The error information is usually stored in a register of definite size. The size of this register is chosen according to economical considerations and/or space limitations. Therefore, it is usually not possible to store a large amount of error debugging data in these registers. As a result, tracking the origin of the errors can be time consuming and frustrating.

Advanced error checking and reporting structure allows identifying the root cause of an error. Each processor unit has numerous error checkers, which can be analyzed after an error has occurred. However, if the errors are found recoverable, the error report structures are cleared with the recovery process. Usually, if due to other interactions, the recovery process does not solve the problem, the recovery process is repeated a number of times. After a given threshold, an error, which was thought to be recoverable, can be escalated to checkstop.

The recoverable errors eventually either lead to successful recovery or lead to checkstop. Currently, in a multiple-error scenario in a sequence without forward progress, only the last error is available and can be analyzed. The information on previous errors is lost.

A prior approach provides useful debugging information over three recovery actions with no forward progress. A stack of combined recovery state information and error information is described. However, the access to the collected data is different. A register table is used to provide useful debugging information over three recovery actions with no forward progress. Such a solution allows getting recovery information but only on the last error indications. The current invention is aimed at storing more error information in the register for debugging purposes.

SUMMARY OF THE INVENTION

In one embodiment, this invention addresses a method of storing the error information for debugging purposes, as generated by the initial and subsequent error occurrences. Given a limited space to keep the error information, the last space is overwritten in order to keep the last error information, while the first spaces are kept with the initial and subsequent error information. In the present invention, a new register is proposed with a size equal to a number of times a word condensed error information, in addition to some bits for recovery counter, which counts the number of recovery actions with no forward progress. The counter can also be located elsewhere. A specific number of the first words within that register collect the sum error information pertaining to that number of errors. The word within that register, following the words already filled with error information, is overwritten so that it always contains the last error indication.

DETAILED DESCRIPTION OF THE PREFERRED EMBODIMENTS

It is an important task to discover the origin of hardware errors. However, it is often not a trivial task because of the quick propagation of errors to different units of the hardware. A large volume of signals must usually be stored for building an error history to help understand the chip's behaviour under debugging.

In an error prone system, it is likely that multiple error scenarios occur when or after a first error is recovered. This invention provides a new instrument and method for recording and access to debugging data related to multiple errors over a sequence of recovery actions.

It is frequently difficult to access debugging data in multiple error scenarios. The error information is usually stored in a register of definite size. The size of this register is chosen according to economical considerations and/or space limitations. Therefore, it is usually not possible to store a large amount of error debugging data in these registers. As a result, tracking the origin of the error can be a difficult task.

The IBM System z has an advanced error checking and reporting structure, which allows identifying the root cause of an error. Each processor unit has numerous error checkers, which can be analyzed after an error has occurred. However, if the errors are found recoverable, the error report structures are cleared with the recovery process. Usually, if due to other interactions, the recovery process does not solve the problem, the recovery process is repeated a number of times. After a given threshold, an error, which was thought to be recoverable, can be escalated to checkstop.

The recoverable errors eventually either lead to recovery successfully or lead to checkstop. Currently, in a multiple-error scenario in a sequence without forward progress, only the last error is available and can be analyzed. The information on previous errors is lost.

In one embodiment, in the present invention, a new register (220) is proposed (possibly but not exclusively of a size 64 bits) with a size equal to a number of times a word condensed error information, in addition to some bits for recovery counter (160), which counts the number of recovery actions with no forward progress. A specific number of the first words within that register collect the sum error information for that number of recovery reasons. The word (150) within that register, which follows the words already filled with error information, is overwritten so that it always contains the latest error indication.

Figure 1:
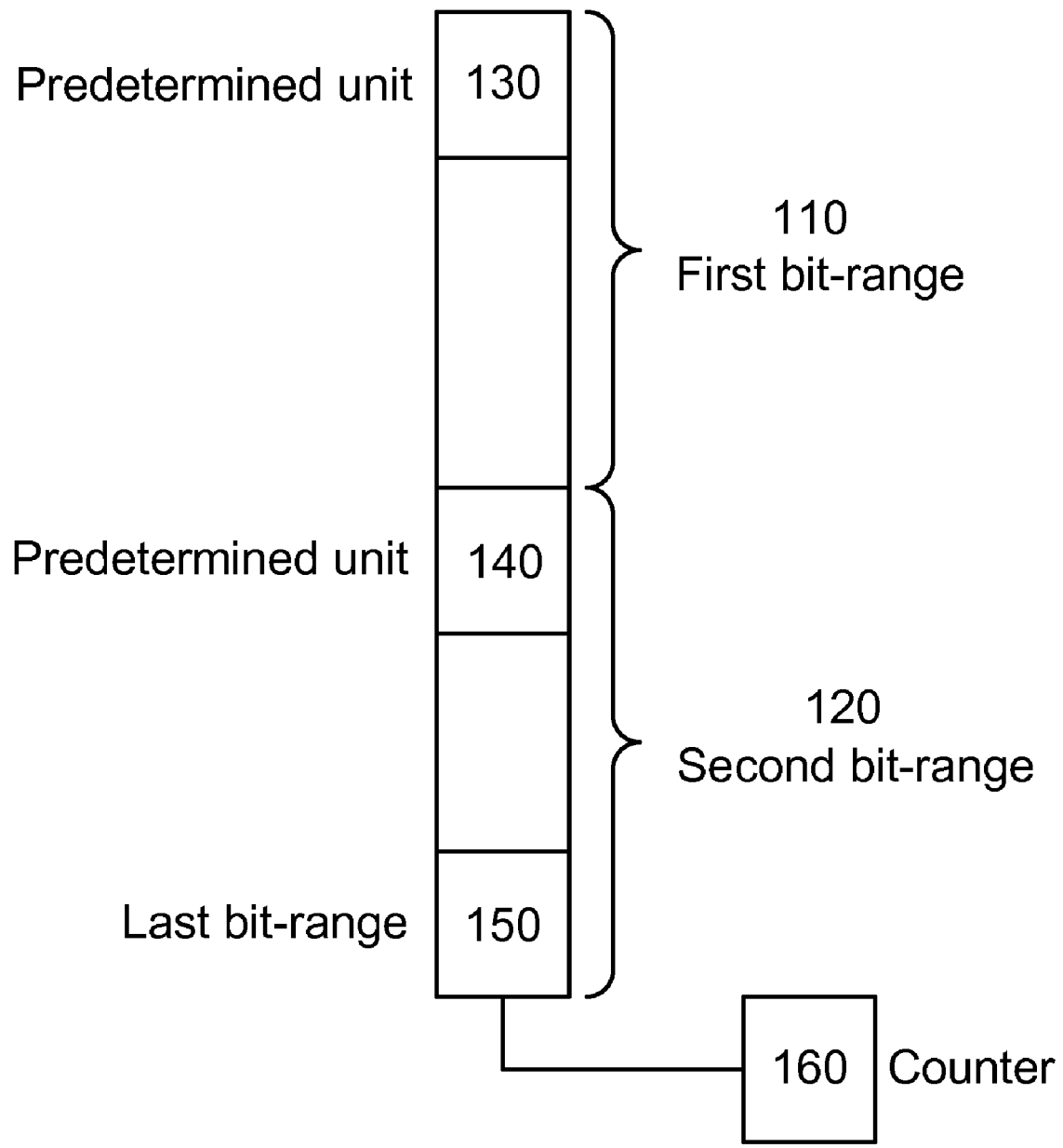
FIG. 1 illustrates the proposed error recovery register and the different allocated bit-ranges on the register in this invention.
Figure 2:
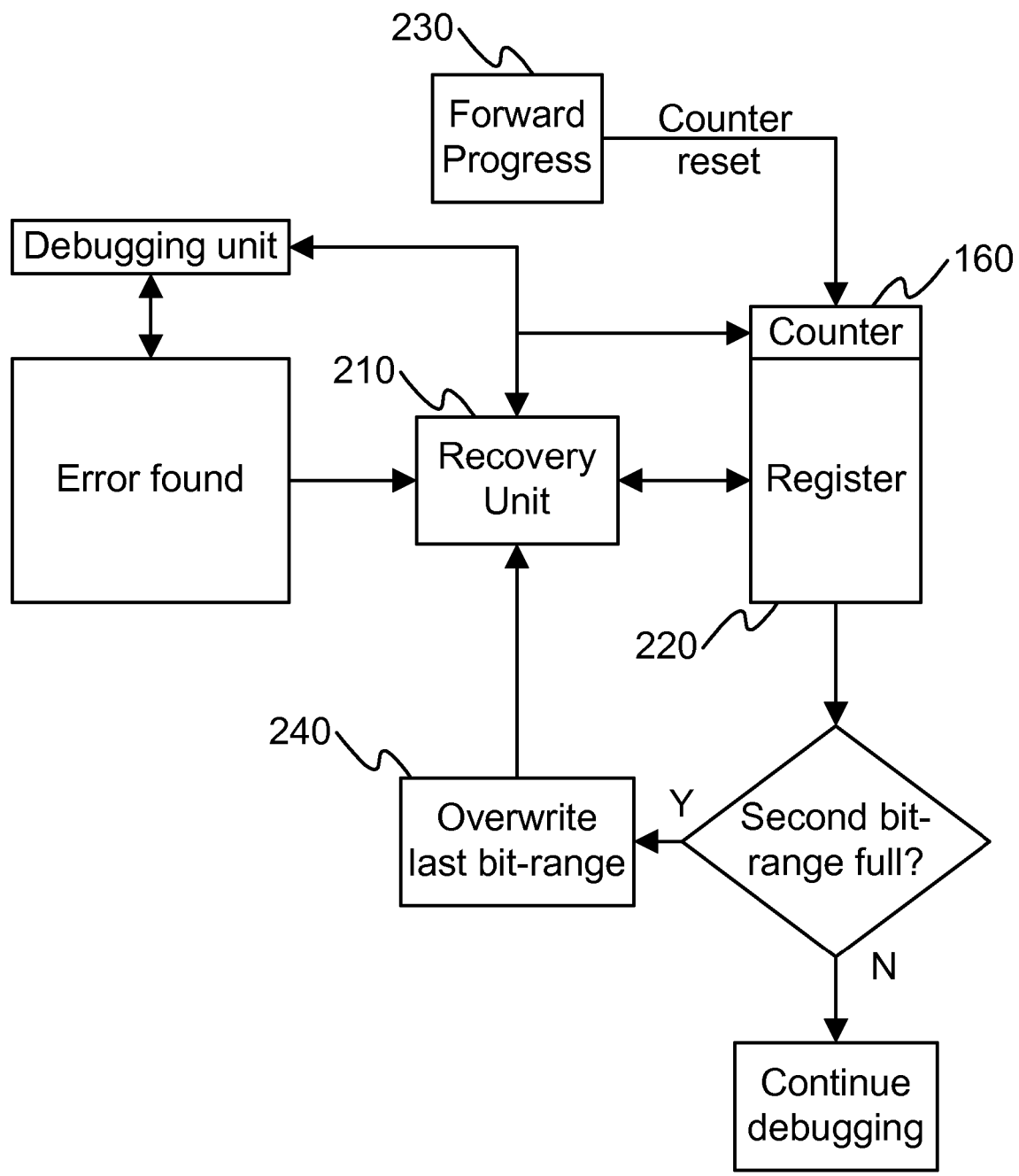
FIG. 2 is a flow chart of the error recovery process as explained by this invention.

Therefore, in this embodiment, a method is presented for error recovery of multiple errors in a microprocessor environment. The microprocessor comprises a recovery unit and the method comprises the steps of: the recovery unit (210) maintaining error information in a register (220), which comprises a counter (see 160 of FIG. 2); the counter tracks the number of errors, which occur after a first error; and a forward progress event (230), which resets the counter (160) to zero.

The register comprises a first bit range (110) and a second bit range (120), and stores information about the first error in the first bit range (110). The first bit range has a first predetermined limit (130). Information about the errors, which occur after a first error, is stored in the second bit range (120). The second bit range has a second predetermined limit (140). The second bit range comprises a last bit range (150). In the case in which the second bit range (120) is full, the recovery unit (210) overwrites (240) the information about the latest error in the last bit range (150), and the recovery unit raises the counter (160).

In case the counter reaches a first threshold for the number of the errors, which occur after a first error, the recovery unit produces core checkstop for the microprocessor, classifies the microprocessor core as defective, and stops the error recovery.

While the recovery unit has not produced the core checkstop for the microprocessor, a recovery handler code reads the architected state of the register. The multiple errors can be associated with binary floating-point unit, decimal floating-point unit, instruction-decode unit, execution unit, cache, fixed-point unit, instruction-fetch unit, and load-and-store unit. Each unit provides a sum error signal (OR of all error checkers) to the recovery unit to trigger recovery or to stop the core (checkstop).

As mentioned before, because of limitations on the total available microprocessor area, it is not feasible to store all the error report structures to provide an error history for each checker. However, it is frequently sufficient to see the history of sum errors and some additional information such as a hardware hang indication. It is regardless of whether Milli-Code had triggered the error, or an unrecoverable memory error had occurred, etc.

Therefore, in one embodiment, this invention describes a new 64-bit register (220) which contains five times a 12-bit condensed error information and a 4-bit recovery counter (160) which indicates the number of recovery actions with no forward progress, hence the number of valid entries in the register. The first four entries collect the sum error information for the first four recovery reasons. The fifth is overwritten so that it always contains the last error indication. That is, this invention differs from prior art by providing not only the reason for the last recovery action which might escalate to checkstop, but also by focusing on the more important first reasons of recovery actions.

Because this register is part of the architected state, it can be read by MilliCode during normal operation (i.e. Recovery Handler code) and via SCOM (serial communication) after the core checkstopped, and while the system continues to operate, without the need for a clock stop in order to read out the scan chains. Therefore, two new important features of this invention are reported. Feature 1 prevents that the recovery reasons be pushed through the stack, i.e. the first four and the last recovery reasons are recorded; and feature 2 makes it possible for the error reasons for multiple errors in a core to be read out while the system keeps operating, not only in checkstop and/or clock stop states.

The recovery unit (RU) has the responsibility to keep a "known good" architected state, on which the processor can "fall back," in case it detects an error. This "known good" state is updated every time an instruction is successfully completed. The process of updating the "known good" state is called checkpointing; the process of falling back to the "known good" state is called recovery.

The first step in the recovery process is to make sure that the "known good" state is not corrupted, i.e. the "known good" state must not be updated once an error was sensed. Therefore, when the RU receives error indications it blocks checkpointing.

The processor consists of several units, such as instruction fetch unit (IFU), load store unit (LSU), etc. Each of these units provides an error indication to RU. With this example of the present invention, these error indications are not only used to block checkpointing, but they are also stored in the above-described register, SYSRD6. In the case of multiple errors, the error counter is used as an index into one of the five error reason slots in SYSRD6. This counter is reset with a forward progress. Once the instructions, which were in the processor pipeline at the time the error was detected, have been successfully executed and checkpointed, the forward progress is reached.

In one embodiment, in other words, this invention attempts to provide additional debugging information in situations where an error occurs and is successfully recovered, but after this recovery, one or more of the instructions, which were in the pipeline at the time the original error occurred, cause an error again, and therefore, cause the machine not to make forward progress eventually. The errors following the original error are sometimes the same, but oftentimes different. This invention provides valuable additional debugging information about more errors.

In one embodiment, the error information is stored in a register that SW can read. As a result, this information can also be checked every time one or more errors are recovered successfully. MilliCode clears SYSRD6 every time after reading, to avoid reading stale data.

Additional information on the apparatus:

Bit Definition of the 12 bits error information stored in a processor internal register:

---

0:1
  '00'b: no error in either the BFU/DFU, CoP or PC;
  '01'b: CoP error and a BFU/DFU error is possible;
  '10'b: BFU/DFU error;
  '11'b: PC error and a BFU/DFU or CoP error is possible
  BFU (Binary Floating point Unit)
  DFU (Decimal Floating point Unit)
2 RU hot error (Recovery Unit)
3 IDU hot error (Instruction Decode Unit)
4 XU hot error (Execution Unit)
5 L1.5 hot error (Cache level L1.5)
6 FXU hot error (Fixed-point Unit)
7 IFU hot or any error (Instruction Fetch Unit)
8 LSU hot or any error (Load/Store Unit)
9 Millicode requested SYSRD4 bit 57
10 Hardware hang
11 UE (Uncorrectable Error)

---

The 12 bit field is used 5 times in the processor internal register (SYSRD6) as follows:

Bits Definition
  0:11 Reason for entering recover the 1st time
  12:23 Reason for entering recover the 2nd time without forward progress
  24:35 Reason for entering recover the 3rd time without forward progress
  36:47 Reason for entering recover the 4th time without forward progress
  48:59 Reason for entering recover the last time without forward progress
  60:63 Internal Recovery Threshold Counter (note that these 4 bits are not writable via Millicode)

Another option to implement the error history could be, e.g.
  0:11 Reason for entering recover the 1st time
  12:23 Reason for entering recover the last time without forward progress
  24:27 Internal Recovery Threshold Counter (note that these 4 bits are not writable via Millicode)
  Such an implementation would require less area and power, but would also provide less debug information.

Example Flow

1. Millicode detects a situation in which a recovery seems to be required and writes D4.57
2. The RU blocks checkpointing and goes through recovery. In addition D6.0: 11 are updated to 0x204, D6.60:63=0x1
3. The processor resumes normal operation, but hits another error (e.g. hardware hang) before 32 instructions completed since the recovery finished.
4. RU blocks checkpointing again and spins through recovery again. D6.12:23=0xC01, D6.60:63=0x2
5. the HW hang does not resolve, i.e. D6.24:35=0xC01, D6.60:63=0x3
6. the HW hang does not resolve, i.e. D6.36:47=0xC01, D6.60:63=0x4
7. the HW hang does not resolve, i.e. D6.48:59=0xC01, D6.60:63=0x5
8. the HW hang does not resolve, i.e. D6.48:59=0xC01, D6.60:63=0x6
9. the HW hang does not resolve, i.e. D6.48:59=0xC01, D6.60:63=0x7
10, the HW hang does not resolve, i.e. D6.48:59=0xC01, D6.60:63=0x8
11. checkstop (recovery threshold reached, processor core classified defective)
12. scan architected state and set up a spare processor Note:

| | |
|---|---|
| D6 | refers to Sys Data Register 6 (i.e. SYSRD6). |
| 0:11 | signifies the bit range in the register, e.g. bits 0 thru 11. |
| 0x204 | is 001000000100b which maps to bits 2 and 9 meaning: RU hot error<br>Millicode requested SYSRD4 bit 57 |
| 0xC01 | is 110000000001b which maps to bits 0, 10, 11 meaning: CoP error and a BFU/DFU error is possible<br>Hardware hang<br>UE |
| D4.57 | refers to bit 57 of data register 4 SYSRD4. |
| D6.60:63 = 0x1 | refers to setting the counter portion of the date register 6 (last 4 bits 60:63) to number 1. |
| D6.0:11 | Word 1 |
| D6.12:23 | Word 2 |
| D6.24:35 | Word 3 |
| D6.36:47 | Word 4 |
| D6.48:59 | Word 5 (Gets overwritten by error info so to have the last error) |

In summary, when an error occurs at the microprocessor level, it is essential to keep the error information to get to the root cause of the problem. When microprocessor architecture has a mechanism to retry and recover from errors, there is a possibility that another or multiple more errors occur before the initial error recovery is complete. This invention addresses a method of keeping the error information from the initial occurrence and the subsequent ones for debugging purposes. Given a limited space to keep the error information, the last space is overwritten in order to keep the last error information, while the first spaces are kept with the initial and subsequent error information. The number of the errors is also incremented in a counter.

Various units in microprocessor can generate error indications, which are sent to the recovery unit (RU). In one embodiment, RU maintains a 64-bit data register (SYSRD6) for purposes of keeping track of the error information. The error information fits into a 12-bit word, so the register has room for 5 pieces of error information plus a 4-bit counter (that can count up to 15 errors). When RU gets error indications, it starts populating the information in the Word spaces on the register and increment the counter. When the sixth or later error indication arrives at RU, it overwrites the error information on the fifth Word space, so that the latest information will be available, while the initial error information is kept at Word1 through Word 4.

In case that less than recovery threshold errors occur before forward progress is indicated, the counter is reset. So, the invention is concerned with those multiple errors that occur without "forward progress", i.e. for those errors that occur during the recovery of the initial error.

The features include a processor with recovery unit, where the RU uses a register to maintain the error information and the register contains a counter to track the number of errors since initial error occurred without forward progress. The forward progress signal resets the counter. The register contains a bit range (condensed Word) to store the initial error information. It contains a bit range to store the subsequent error information until a predetermined limit (e.g. 4 more bit ranges). It overwrites the last bit range to update the stored data about the last error information.

Upon getting an error indication, RU writes the error information in the register and increments the counter. If the count of the error is more than the number of the space available in the register, RU overwrites the error information on the last space provides (i.e. last condensed Word). Upon reaching an internal recovery threshold counter for number of errors attempted to recover since the initial occurrence of an error (e.g. 8), RU produces the checkstop (i.e. processor core classified defective) preventing further attempt at error recovery.

Other features include specifying the size of the register, number of the words, and the size of the counter, and specifying the bit arrangement in Word indicating the type of error information contained.

When one or more errors are recovered successfully, MilliCode clears SYSRD6 every time after reading to avoid reading stale data. However, in another embodiment, this is not strictly necessary, as the recovery counter already indicates the number of valid entries.

In one embodiment, with a second counter incremented by recovery and cleared by millicode only, multiple error scenarios requiring several spins through recovery can also be analyzed where these errors eventually recover and do not lead to checkstop. An example is a counter at SYSRD4.24:27. Millicode recovery handler only needs to store the content of this counter and that of SYSRD6 to a designated memory location, and then, reset the SYSRD4.24:27 counter.

In one embodiment, after a core checkstop, the scan ring data can also be dumped and analyzed.

Any variations of the above teaching are also intended to be covered by this patent application.

The invention claimed is:

1. A method for error recovery for multiple errors in a microprocessor environment, wherein said microprocessor comprises a recovery unit, said method comprising:
    said recovery unit maintaining error information in a register;
    wherein said register comprises a counter;
    said counter tracking number of errors which occur after a first error;
    a forward progress event resetting said counter to zero;
    wherein said register comprises a first bit range and a second bit range;
    storing information about said first error in said first bit range;
    wherein said first bit range has a first predetermined limit;
    storing information about said errors which occur after a first error in said second bit range;

wherein said second bit range has a second predetermined limit;

wherein said second bit range comprises a last bit range; and in case said second bit range is full, said recovery unit overwriting information about the latest error in said last bit range, and said recovery unit raising said counter.

2. The method for error recovery for multiple errors in a microprocessor environment as recited in claim 1, wherein, in case said counter reaches a first threshold for the number of said errors which occur after said first error, said recovery unit producing core checkstop for said microprocessor, said recovery unit classifying said microprocessor core as defective, and said recovery unit stopping said error recovery.

3. The method for error recovery for multiple errors in a microprocessor environment as recited in claim 2, wherein a recovery code handler reading the architected state of said register, unless said recovery unit produced said core checkstop for said microprocessor.

4. The method for error recovery for multiple errors in a microprocessor environment as recited in claim 3, wherein said multiple errors are associated with binary floating-point unit, decimal floating-point unit, instruction-decode unit, execution unit, cache, fixed-point unit, instruction-fetch unit, and load-and-store unit.

5. The method for error recovery for multiple errors in a microprocessor environment as recited in claim 4, wherein one or more causes of said multiple errors are analyzed.

6. The method for error recovery for multiple errors in a microprocessor environment as recited in claim 4, wherein a stack of combined recovery state information and error information is described.

7. The method for error recovery for multiple errors in a microprocessor environment as recited in claim 4, wherein said first bit range or said second bit range is a multiple of 64 bits.

8. The method for error recovery for multiple errors in a microprocessor environment as recited in claim 4, wherein a history of sum errors is analyzed.

9. The method for error recovery for multiple errors in a microprocessor environment as recited in claim 4, further comprising: updating a known good state, every time an instruction is successfully completed.

10. The method for error recovery for multiple errors in a microprocessor environment as recited in claim 1, wherein said microprocessor further comprises at least one of an instruction fetch unit, a load-store unit, and a binary floating point unit.

11. The method for error recovery for multiple errors in a microprocessor environment as recited in claim 1, wherein a stack of combined recovery state information and error information is described.

12. The method for error recovery for multiple errors in a microprocessor environment as recited in claim 1, wherein a history of sum errors is analyzed.

13. The method for error recovery for multiple errors in a microprocessor environment as recited in claim 1, wherein said microprocessor further comprises a decimal floating point unit.

14. The method for error recovery for multiple errors in a microprocessor environment as recited in claim 1, wherein said microprocessor further comprises an instruction decode unit.

15. The method for error recovery for multiple errors in a microprocessor environment as recited in claim 1, wherein said microprocessor further comprises an execution unit.

16. A system for error recovery for multiple errors in a microprocessor environment, said system comprising:

a recovery unit;

a register; wherein said recovery unit maintains error information in said register;

wherein said register comprises a counter;

wherein said counter tracks number of errors which occur after a first error;

wherein a forward progress event resets said counter to zero;

wherein said register comprises a first bit range and a second bit range;

wherein information about said first error is stored in said first bit range;

wherein said first bit range has a first predetermined limit; wherein information about said errors which occur after said first error is stored in said second bit range;

wherein said second bit range has a second predetermined limit;

wherein said second bit range comprises a last bit range; and in case said second bit range is full, said recovery unit overwrites information about the latest error in said last bit range, and said recovery unit raises said counter.

17. The system for error recovery for multiple errors in a microprocessor environment as recited in claim 16, wherein, in case said counter reaches a first threshold for the number of said errors which occur after said first error, said recovery unit produces core checkstop for said microprocessor, said recovery unit classifies said microprocessor core as defective, and said recovery unit stops said error recovery.

18. The system for error recovery for multiple errors in a microprocessor environment as recited in claim 17, wherein a recovery code handler reads the architected state of said register, unless said recovery unit produced said core checkstop for said microprocessor.

19. The system for error recovery for multiple errors in a microprocessor environment as recited in claim 18, wherein said multiple errors are associated with binary floating-point unit, decimal floating-point unit, instruction-decode unit, execution unit, cache, fixed-point unit, instruction-fetch unit, and load-and-store unit.

20. The system for error recovery for multiple errors in a microprocessor environment as recited in claim 16, wherein at least one of: a history of sum errors is analyzed, and a stack of combined recovery state information and error information is described.

* * * * *